United States Patent [19]
Yamada

[11] Patent Number: 4,477,171
[45] Date of Patent: Oct. 16, 1984

[54] ELECTRONIC FLASH SYSTEM

[75] Inventor: Masanori Yamada, Kanagawa, Japan

[73] Assignee: Canon Kabushiki Kaisha, Tokyo, Japan

[21] Appl. No.: 402,600

[22] Filed: Jul. 28, 1982

[30] Foreign Application Priority Data

Jul. 29, 1981 [JP] Japan ................................ 56-118633

[51] Int. Cl.³ ............................................ G03B 15/05
[52] U.S. Cl. .................................... 354/416; 354/444; 354/480
[58] Field of Search ........................ 354/33, 32, 34, 35, 354/60 F, 139, 145, 149, 416, 417, 479, 480, 418, 448, 441–445; 315/241 P, 151

[56] References Cited
U.S. PATENT DOCUMENTS 3,726,197 4/1973 Hasegawa et al. ................ 354/33 X
4,382,666 5/1983 Ohtaki et al. ......................... 354/33

Primary Examiner—William B. Perkey
Attorney, Agent, or Firm—Toren, McGeady and Stanger

[57] ABSTRACT

There is disclosed an electronic flash system having a diaphragm which is operated on the basis of an aperture control signal from an electronic flash device. A light sensitive element position in the camera system produces an electrical signal representing the amount of flash light passed through the aforesaid diaphragm of the adjusted aperture size. A circuit for controlling the amount of flash light emitted from the flash device controls the amount of flash light based on the electrical signal.

4 Claims, 2 Drawing Figures

ELECTRONIC FLASH SYSTEM

BACKGROUND OF THE INVENTION

This invention relates to electronic flash systems and more particularly to an electronic flash system which controls the size of the aperture in a photographic objective lens on the basis of aperture information provided by a computer type electronic flash device.

When the aperture value set on the flash device is coincident with that set on the camera, i.e. the aperture size of a diaphragm in the photographic objective lens, a correct flash exposure can be automatically obtained. Even with such a system, however, photographers unaccustomed to flash photography are liable to choose an aperture value for the flash device which never coincides with aperture values available for the interchangeable objective lens being used, i.e. apertures which are beyond the dynamic range of diaphragm control of the objective lens. Because different lenses have different F-numbers at the greatest aperture opening, there are situations where changing lenses makes it impossible to obtain a correct exposure.

It is an object of the present invention to provide an electronic flash system which overcomes the above-described drawback of the conventional system.

This and other objects of the present invention will become apparent from the following detained description of an embodiment thereof.

SUMMARY OF THE INVENTION

It has been found that the objects of the invention may be obtained in the combination of a camera and an electronic flash device which includes a flash emitting means for emitting light to illuminate an object to be photographed, diaphragm means provided in the camera, diaphragm control means for controlling an aperture size of the diaphragm means on the basis of an aperture value information to be applied from the outside of the camera, and light sensitive means for generating an electrical signal corresponding to the reflected light from the object after being passed through the diaphragm means control by the diaphragm control means. The apparatus also includes light control means for preventing production of the light from the flash emitting means when the electrical signal has reached a predetermined value.

DESCRIPTION OF THE PREFERRED EMBODIMENTS

Figure 1:
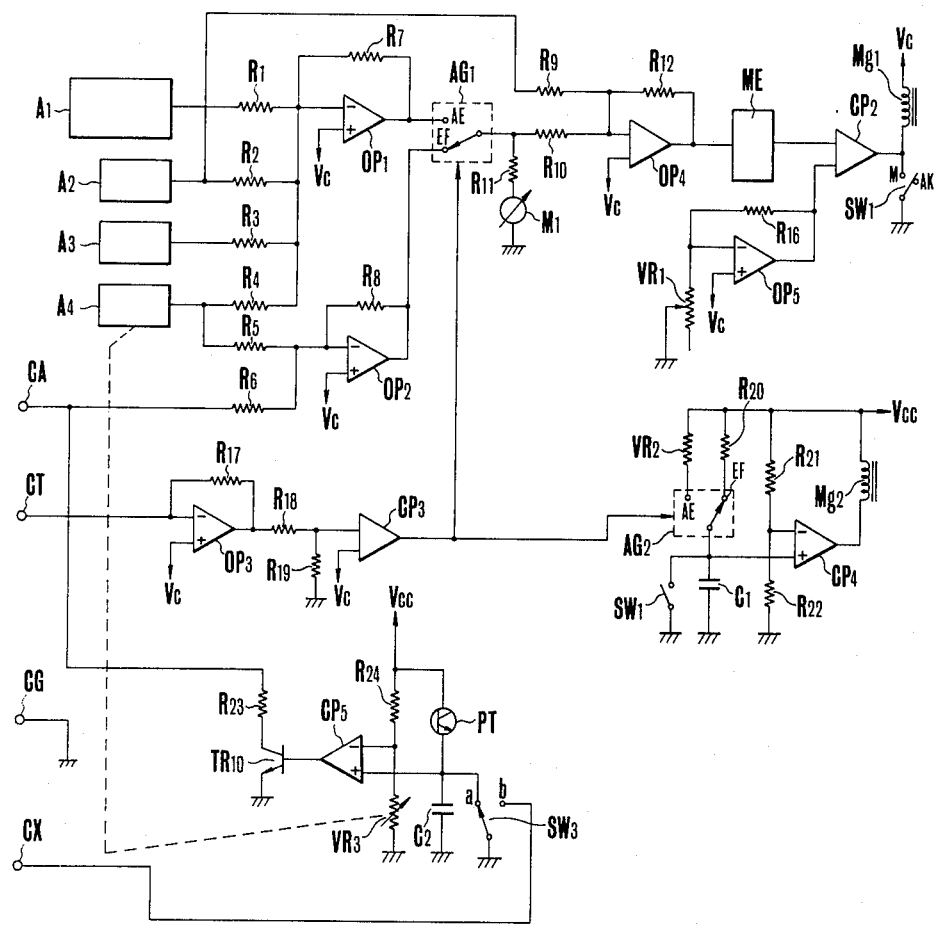
FIG. 1 is an electrical circuit diagram of a camera with an electronic flash system according to the present invention.

FIG. 1 illustrates an example of the circuitry of a single lens reflex camera which employs, in the electronic flash system, one form of the present invention. In the drawing, a light measuring circuit A1 produces an electrical signal representing a light value corresponding to light coming from an object to be photographed through an interchangeable objective lens 201 (see FIG. 3); a maximum possible aperture information forming circuit A2 produces an electrical signal representing an aperture value at the full open diaphragm of the objective lens (hereinafter referred to as Avo); a daylight shutter time information setting circuit A3; a film sensitivity information setting circuit A4; an operational amplifier $OP_1$ having an input to which the outputs of circuits A1, A2, A3 and A4 are applied and has an output which produces a signal representing $(Bv - Avo) + Avo + Sv - Tv = Av$, or the absolute value of the diaphragm aperture opening for obtaining a correct exposure. An interconnection terminal CA couples with an interconnection terminal CAA of a flash device to be described later, aperture information AvF from the flash device is introduced into the camera by the terminal CA. An operational amplifier $OP_2$ has an input to which the aperture information AvF from the aforesaid flash device and the film speed information SV are applied and has an output which produces information representing $AvF + Sv = Av$, or the absolute value of the diaphragm aperture opening for obtaining a correct exposure as identified by $OP_2$. A switch $AG_2$ changes position by an electrical signal from the flash device, for example, the full charging of a main condenser. The electrical signal enters an an interconnection terminal CT. When the signal is not present, the switch $AG_1$ takes a daylight exposure position AE, and when the signal is not present, it takes a flash exposure position EF. A meter $M_1$ displays an aperture value representing the absolute aperture value information Av for daylight or flash exposure, depending upon the selected position of the aforesaid switch $AG_1$. The meter $M_1$ is connected through a resistor $R_{11}$ to the aforesaid switch $AG_1$. An operational amplifier $OP_4$ has an input to which are supplied the outputs of circuit A2 and switch $AG_1$, or the full open aperture information Avo and the absolute aperture value Av and has an output which produces information expressed by $Av - Avo = \Delta Av$ or information representing the number of aperture stops to be closed down from the full open aperture of the objective lens. A memory circuit ME has an input to which the output of the aforesaid operational amplifier $OP_4$, or the aperture stop number information $\alpha Av$ is supplied so that the aforesaid aperture stop number information is stored, through a memory switch (not shown), in response to the shutter release actuation.

A variable resistor $VR_1$ has a brush which changes its position as diaphragm blades move; an operational amplifier $OP_5$ has an output which produces information representing the number of aperture stops actually closed down from the full open aperture.

A comparator $CP_2$ compares the aperture stop number information $\Delta Av$ or the number of aperture stops to be closed down to effect a correct exposure from the memory circuit ME with the actually closed down aperture stop number information $\Delta Av'$ upon substantial coincidence of the aforesaid $\Delta Av$ and $\Delta Av'$ with each other to actuate a magnet $Mg_1$ for stopping movement of the diaphragm blades 202, to be described later, so that the size of aperture opening of the diaphragm 202 is adjusted to a value closed down from the full open aperture by the number of stops corresponding to $\Delta Av$, or an aperture value corresponding to the aforesaid correct aperature information Av. A switch $SW_1$ cooperates with a diaphragm ring of the objective lens mounting in such a manner that when in an AK position, automatic adjustment of the aperture is formed, as has been described above, and when in an M position, the aperture opening size is manually adjusted. A switch AG$_2$ is arranged similarly to the aforesaid switch AG$_1$ to change its position in response to an electrical signal, for example, representing the fact that the main condenser is fully charged, from the flash device, the electrical signal given through the terminal CT. When the signal is not given, an AE position, or a daylight exposure position is selected. When the electrical signal is given, an EF position, or flash exposure position is selected.

The apparatus includes a variable resistor VR$_2$ for forming the set value of shutter time for daylight photography; a resistor R$_{20}$ for forming a shutter time for flash photography; a condenser C$_1$ for forming a time constant circuit together with either the aforesaid variable resistor VR$_2$ or the aforesaid resistor R$_{20}$; a start switch SW$_2$ arranged to be opened when a shutter (not shown) is opened; a comparator CP$_4$; a magnet Mg$_2$ for controlling the closing operation of the shutter. The aforesaid parts VR$_2$, R$_{20}$, C$_1$, AG$_2$, SW$_2$, resistors R$_{21}$, R$_{22}$, comparator CP$_4$, and Mg$_2$ constitute a shutter control circuit operating in such a manner that when the AE position is selected, the shutter time is adjusted by the variable resistor VR$_2$ and condenser C$_1$ for daylight exposure. When the EF position is selected, the shutter time is adjusted by the resistor R$_{20}$ and the condenser C$_1$ for flash exposure.

Figure 3:
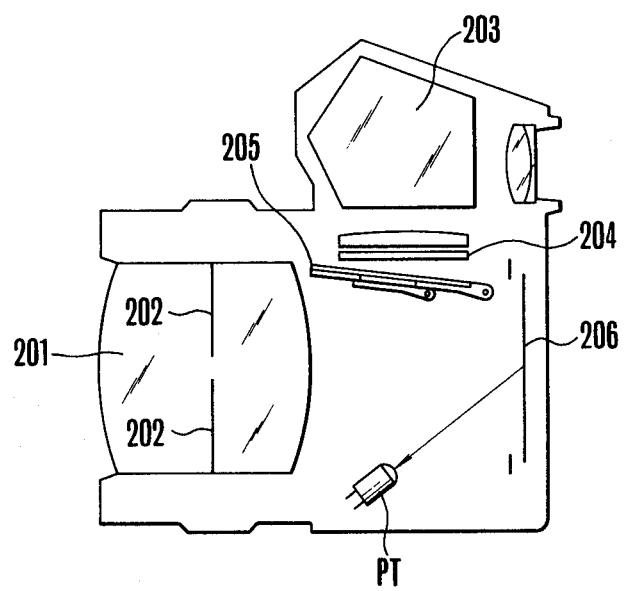
FIG. 3 is a schematic vertical sectional view of the camera of FIG. 1.

A photo transistor PT, when an exposure is made, receives light from the discharge tube after reflection from an object to be photographed passes through the objective lens 201, diaphragm 202 and film plane 206. In FIG. 3 there is shown a penta prism; a ground glass 204; and a film 206. Also illustrated in FIG. 1 is a variable resistor VR$_3$ the resistance value of which is related to the set value of film sensitivity and which defines a critical level for the amount of light received by the photo transistor PT to obtain a correct exposure as a function of the film sensitivity. An integration condenser C$_2$ is connected to the photo transistor PT for converting the amount of light received by the aforesaid photo transistor PT to a voltage. A comparator CP$_5$ has an output which rises when the amount of light received by the photo transistor PT substantially coincides with the aforesaid critical level so that a transistor TR$_{10}$ is turned on, thereby giving a firing stop signal to the flash device through a terminal CA.

Figure 2:
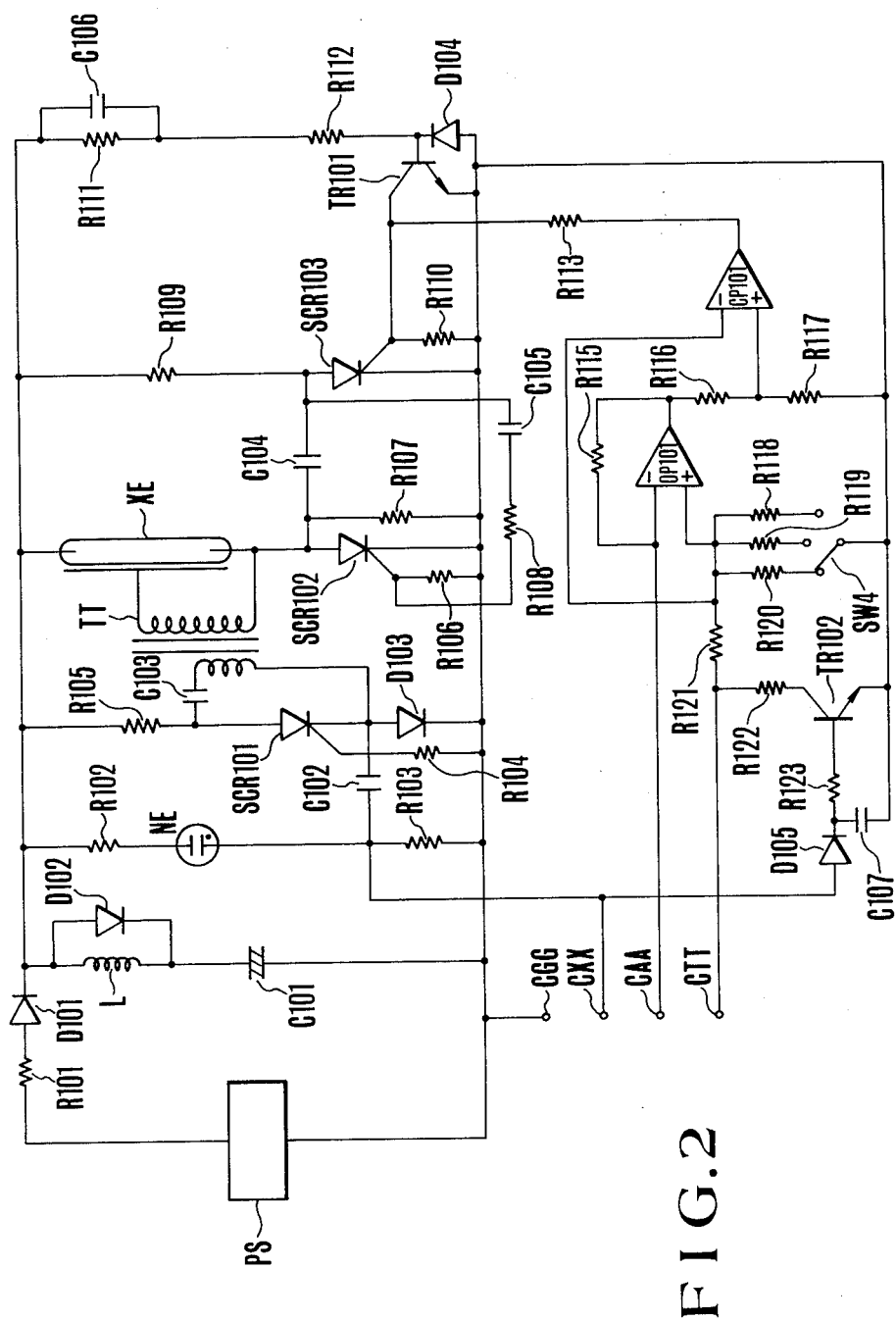
FIG. 2 is an electrical circuit diagram of an electronic flash device of the system of FIG. 1.

FIG. 2 illustrates an example of the circuitry of the flash device in the aforesaid electronic flash system. In FIG. 2, a main capacitor C101, known to those skilled in the art, is supplied with current from an electrical power source PS through a resistor R101, rectifier diode D101 and coil L; a diode D102 connected in parallel with the coil L is a noise killer diode; a series-connected circuit includes a resistor R102 and a neon tube NE. A resistor R103 is a detecting circuit for detecting the voltage stored on the main capacitor C101. One pole of the neon tube NE of the circuit is connected through a capacitor C102 to the cathode of a thyristor SCR 101 and also to an interconnection terminal CXX for coupling with an interconnection terminal CX of the camera, and a diode D105. The aforesaid thyristor SCR 101 forms a trigger circuit, to which the anode is connected through a resistor R105 and a coil L to the main capacitor C101, and to which the cathode is connected through a primary winding of a trigger transformer TT to a trigger capacitor C103.

Furthermore, the gate of the thyristor SCR 101 is connected to a resistor R104. A discharge tube XE, known to those skilled in the art, has one electrode which is connected through a firing control thyristor SCR 102 to the main capacitor C101 and has its gate connected to the secondary winding of the aforesaid trigger transformer. The aforesaid thyristor SCR 102 has main electrodes across which are connected a circuit comprising a commutation capacitor C104 and auxiliary thyristor SCR 103, as is known to those skilled in the art. Its gate is connected to a thyristor trigger circuit comprising resistors R106 and R103 and a capacitor C105, known to those skilled in the art. A resistor R107 is connected in parallel to the thyristor SCR 102; the series connected circuit, including the discharge tube XE and main thyristor SCR 102, connected in parallel to a series connected circuit including resistors R111 and R112, a capacitor C106, a diode D104 and a transistor TR101 as a faulty operation preventing circuit for preventing the auxiliary thyristor SCR 103 from conducting before the discharge tube XE starts to fire. The collector of the npn transistor TR101 of the preventing circuit is connected through a resistor R113 to the output of a comparator CP101. The positive input terminal of the comparator CP101 is connected through a voltage divider circuit (R116, R117) to the output of an operational amplifier OP101, and its negative input terminal is connected through a resistor R121 to an interconnection terminal CTT. A group of resistors R118, R119 and R120, for setting proper aperture values, are each connected at one end to respective fixed contacts of a switch SW$_4$ for selecting either one of the aforesaid resistors R118, R119 and R120 depending upon the selected aperture value, and at their opposite ends to the non-inversion input terminal of the aforesaid operational amplifier OP101. The apparatus includes resistors R122 and R123; an npn transistor TR102; and a capacitor C107.

The operation of the electronic flash system of the above-described construction will next be explained. For flash photography it is assumed that the preset aperture value lies outside the dynamic range of control available from the objective lens of the camera.

As the main capacitor C101 is charged by the electrical power source PS through the resistor R101 and diode D101 and when the voltage on the main capacitor C101 reaches a predetermined level, the neon tube NE is turned on, indicating that firing preparation is completed. Its lighting current flows through the diode D103 to charge the condenser C102 and also through the diode D105 and resistor R123 to supply base current to the base of the transistor TR102, thereby the transistor TR102 conducts. As the transistor TR102 is conducting, collector current flows through the resistor R122, terminals CTT and CT and resistor R$_{17}$, and the output of the operational amplifier OP3 rises which in turn causes the output of the comparator CP$_3$ to also rise. Therefore, as has been stated above, the switches AG$_1$ and AG$_2$ are automatically changed over from the AE position to the EF position. Since the non-inversion input terminal of the operational amplifier OP3 is given a stabilized reference voltage Vc, its inversion input terminal also has the reference voltage, and this voltage is applied through the terminal CT to the terminal CTT. Therefore to the non-inversion input terminal of the operational amplifier OP101 is supplied a divided voltage corresponding to the aperture information AvF determined by the resistors R121 and R120 selected by the switch SW4. This in turn causes the divided voltage to appear at the inversion input terminal of the operational amplifier OP101. Then the divided voltage corresponding to the aperture information AvF is supplied through the terminal CAA to the terminal CA. When the aperture information AvF is given to the terminal CA, as has been stated above, the aperture value information AvF given to the terminal CA and the film sensitivity information Sv are combined by the operational amplifier OP$_2$ to produce the absolute aperture value information Av at the output of the switch AG$_1$.

Therefore, as has been stated above, the meter M$_1$ displays the aforesaid absolute aperture value.

On the other hand, the changeover switch AG$_2$ also is, as has been stated above, in the EF position where the shutter speed is adjusted to a value suited for flash exposure determined by the resistor R$_{20}$ and the capacitor C$_1$.

Upon actuation of a camera release the diaphragm is adjusted, in a way known to those skilled in the art, dependent upon the information related to the aperture selected by the switch SW$_4$ (FIG. 2) as the responsive distance range setting means and the film sensitivity. In this case, the aperture value selected by the switch SW$_4$ is beyond the control range of the objective lens. Therefore, the size of the objective lens aperture opening is adjusted to either one of the maximum or minimum possible apertures. Then, when the known shutter (not shown) is fully open, the switch SW$_3$ is changed over from "a" position to "b" position, thereby the known trigger circuit comprised of the resistors R102, R103, R104 and R105, capacitors C102, C103, neon tube NE, SCR 101 and diode D103 of the flash device is driven through the terminals CXX and CX and the terminals CGG and CG to ionize the discharge tube XE. The thyristor SCR 102 is rendered conducting and initiates firing of flash light.

The photo transistor PT, as illustrated in FIG. 3, receives flash light coming from the object (not shown) to be photographed through the diaphragm 202 of the objective lens at an aperture adjusted to the limit value, for example, F2, by the above described aperture adjusting operation and also reflected from the film surface, while the amount of light received is converted to a voltage by the capacitor C$_2$. When the amount of received light reaches the predetermined critical level determined by the film sensitivity, that is, when the voltage on the aforesaid capacitor C$_2$ reaches a predetermined level by the film sensitivity setting resistor VR$_3$, the output of the comparator CP$_5$ rises, thereby the transistor TR$_{10}$ is rendered conducting. Such conduction of the transistor TR$_{10}$ causes current flow through the resistor R$_{23}$, terminals CA and CAA, and resistor R115. Therefore the output of the operational amplifier OP101 rises and the change is given to the positive input terminal of the comparator CP101. Then, the output of the comparator CP101 rises and the comparator CP101 gives the thyristor SCR 103 gate current through the resistor R113, thereby the thyristor SCR 103 is rendered conducting. Such conduction causes the known flash light control circuit comprised of the flash discharge tube XE, SCR 102, SCR 103, resistors 106 to 109 and capacitor 105 to be driven, thus terminating the firing of the flash discharge tube. The shutter speed is also adjusted to the shutter time for flash exposure. Therefore, the film 206 is correctly exposed. It is to be noted that the switch SW$_3$ takes "a" position after the termination of the firing to short-circuit the integration capacitor C$_2$. Also in FIG. 2, the resistors R111 and R112, capacitor C106, diode D104 and transistor TR101 constitute a circuit which holds the transistor TR101 in the non-conducting state only when the flash tube is firing so that the flash firing stop signal is allowed to enter the gate of the thyristor SCR 103. The operation of this circuit is as follows: When firing takes place, the voltage of the main capacitor C101 drops, and the charge stored in the capacitor C106 gives a reversed bias across the base-emitter path of the transistor TR101 through the flash discharge tube XE, the main thyristor SCR 102 and resistor R112, thereby the transistor TR101 is turned off. Therefore, the firing stop signal given through the resistor R113 is given to the gate of the thyristor SCR 103. When normal firing does not occur, base current is given to the transistor TR101 through the resistor R111 and R112 so that the transistor TR101 is in an ON state, and as the gate-cathode path of the SCR 103 is short-circuited, the aforesaid firing stop signal is hindered from being given from the comparator CP101 to the base of the thyristor SCR 103. The aforesaid faulty operation prevention circuit is provided in order to prevent the charge on the main capacitor C101 from being discharged through the resistor R109 and the thyristor SCR 103, as the thyristor. SCR 103 is rendered conducting when the terminal CAA of the flash device is unintentionally grounded, so that the output of the comparator CP101 rises through the operational amplifier OP101.

It is to be noted that when the aperture value selected by the selector switch SW$_4$ (FIG. 2) lies in the range of controllable aperture values of the objective lens of the camera, the size of the aperture opening of the objective lens is adjusted to a value corresponding to the combination of the selected aperture information AvF and the film sensitivity, and the flash light receiving photo transistor PT receives flash light reflected from the film surface after passing through the thus-adjusted diaphragm, so that the film 206 is correctly exposed likewise as in the foregoing case.

In this system, a daylight exposure is made as follows: In daylight exposures, the output level of the comparator CP$_3$ is so low that the switch AG$_1$ selects the AE position. Here, when the shutter is released, the absolute aperture value information corresponding to the combination of the preset shutter time, film sensitivity, object brightness, etc. is produced from the switch AG$_1$ so that the meter M$_1$ displays the aperture value and the size of the aperture opening of the diaphragm 202 is adjusted to the aforesaid aperture value by the magnet Mg$_1$, as has been stated above.

Since the switch AG$_2$ selects the AE position, the shutter is adjusted to the shutter time set by the shutter control circuit, as has been stated above.

As has been described above, according to the present invention, even when the aperture value to be specified from outside the camera is beyond the dynamic range of diaphragm control of the objective lens, for example, larger than the full open or maximum possible aperture value, or smaller than the minimum possible aperture value, the correct exposure can be obtained because the amount of flash light emitted is controlled by sensing the flash light amount passed through the objective lens.

Furthermore, since the light passing through the diaphragm of the objective lens is used in light measurement, a parallax is not produced and an additional advantage is that the operation can be controlled by the effective F number, for example.

What I claimed is:

1. A combination of a camera selectively attachable with a plurality of interchangeable lenses and an electronic flash device detachable from said camera, comprising:
    (a) flash emitting means for emitting light to illuminate an object to be photographed;
    (b) diaphragm means provided in each of said lenses, dynamic ranges of at least two of the diaphragm means being different from each other;
    (c) diaphragm control means for controlling an aperture size of said diaphragm means of the attached lens on the basis of one of a plurality of aperture value signals to be applied from the outside of said camera;
    (d) means provided in said electronic flash device and for selectively producing said aperture value signals to be applied to said diaphragm control means, one of the aperture value signals being out of the dynamic range of at least one of said lenses;
    (e) light sensitive means responsive to the reflected light from the object after being passed through said diaphragm means controlled by said diaphragm control means and for generating a control signal when an amount of the reflected light has reached a predetermined level; and
    (f) light control means for terminating emission of the light from the flash emitting means in response to the control signal from said light sensitive means.

2. The combination according to claim 1, wherein said light sensitive means includes a light sensitive element responsive to a light reflective by a film provided in said camera.

3. The combination according to claim 1, wherein said light sensitive element is provided in a body of the camera.

4. A combination of a camera selectively attachable with a plurality of interchangeable lenses and an electronic flash device, comprising:
    (a) flash emitting means for emitting light to illuminate an object to be photographed;
    (b) diaphragm means provided in each of said lenses, dynamic ranges of at least two of the diaphragm means being different from each other;
    (c) diaphragm control means for controlling an aperture size of said diaphragm means of the attached lens on the basis of one of a plurality of electrical signals to be applied from the outside of said camera;
    (d) means provided in said electronic flash device and for selectively producing said electrical signals to decide said aperture size;
    (e) light sensitive means responsive to the reflected light from the object after being passed through said diaphragm means controlled by said diaphragm control means and for generating a control signal when an amount of the reflected light has reached a predetermined level; and
    (f) light control means for terminating emission of the light from the flash emitting means in response to the control signal from said light sensitive means.

* * * * *